(12) United States Patent
Tapia et al.

(10) Patent No.: US 9,826,430 B2
(45) Date of Patent: Nov. 21, 2017

(54) CONTROLLING UPLINK CONGESTION IN A WIRELESS COMMUNICATION NETWORK

(71) Applicant: T-Mobile USA, Inc, Bellevue, WA (US)

(72) Inventors: Pablo Tapia, Snoqualmie, WA (US); Carl Craig Williams, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 155 days.

(21) Appl. No.: 13/676,025

(22) Filed: Nov. 13, 2012

(65) Prior Publication Data

US 2013/0121147 A1 May 16, 2013

Related U.S. Application Data

(60) Provisional application No. 61/559,669, filed on Nov. 14, 2011.

(51) Int. Cl.
*H04W 28/02* (2009.01)
*H04W 28/06* (2009.01)
*H04W 36/22* (2009.01)
*H04W 24/02* (2009.01)
*H04W 52/00* (2009.01)
(Continued)

(52) U.S. Cl.
CPC ....... *H04W 28/0289* (2013.01); *H04L 1/0001* (2013.01); *H04W 24/02* (2013.01); *H04W 28/0205* (2013.01); *H04W 28/0284* (2013.01); *H04W 36/22* (2013.01);
(Continued)

(58) Field of Classification Search
None
See application file for complete search history.

(56) References Cited

U.S. PATENT DOCUMENTS 7,978,682 B2    7/2011   Irwin
8,098,590 B2    1/2012   Catovic et al.
(Continued)

FOREIGN PATENT DOCUMENTS

EP    1357681 A1   10/2003
EP    2204016 B1    5/2011
(Continued)

OTHER PUBLICATIONS

The PCT Search Report and Written Opinion dated Apr. 1, 2013 for PCT Application No. PCT/US12/65092, 14 pages.
(Continued)

*Primary Examiner* — Ayaz Sheikh
*Assistant Examiner* — Tarell Hampton
(74) *Attorney, Agent, or Firm* — Lee & Hayes, PLLC

(57) ABSTRACT

A computing device, which is associated with a telecommunication access network, is configured to detect (i) congestion in uplink traffic from a plurality of user equipments (UEs) to a base station (BS), and (ii) a level of the congestion in the uplink traffic from the plurality of UEs to the BS. The computing device is further configured to modify a network or UE setting to generate a modified setting, and transmit the modified setting to a first UE of the plurality of UEs, to facilitate the first UE to transmit to the BS in accordance with the modified setting. In an embodiment, the computing device is the BS.

24 Claims, 3 Drawing Sheets

(51) Int. Cl.
  *H04L 1/00* (2006.01)
  *H04W 52/34* (2009.01)
  *H04W 52/36* (2009.01)
  *H04B 17/373* (2015.01)
  *H04B 17/382* (2015.01)

(52) U.S. Cl.
  CPC ....... *H04W 52/343* (2013.01); *H04W 52/367* (2013.01); *H04B 17/373* (2015.01); *H04B 17/382* (2015.01)

(56) References Cited

U.S. PATENT DOCUMENTS

| | | | |
|---|---|---|---|
| 8,208,406 B1* | 6/2012 | Jiang et al. | 370/255 |
| 8,369,800 B2 | 2/2013 | Li et al. | |
| 8,566,441 B2 | 10/2013 | Agarwal et al. | |
| 8,570,888 B1 | 10/2013 | Vargantwar | |
| 8,929,914 B2 | 1/2015 | Davis | |
| 2003/0003921 A1* | 1/2003 | Laakso | 455/453 |
| 2003/0218974 A1* | 11/2003 | Zuniga | 370/229 |
| 2004/0203981 A1 | 10/2004 | Budka et al. | |
| 2004/0246919 A1 | 12/2004 | Larsson | |
| 2006/0128312 A1 | 6/2006 | Declerck et al. | |
| 2006/0159016 A1 | 7/2006 | Sagfors et al. | |
| 2006/0250965 A1 | 11/2006 | Irwin | |
| 2007/0127417 A1 | 6/2007 | Kalika | |
| 2007/0237150 A1 | 10/2007 | Wood | |
| 2008/0002659 A1 | 1/2008 | Fontaine et al. | |
| 2008/0043773 A1 | 2/2008 | Ihori | |
| 2008/0171550 A1* | 7/2008 | Zhao | H04W 74/02 455/445 |
| 2008/0268864 A1 | 10/2008 | Andersson et al. | |
| 2009/0061774 A1 | 3/2009 | Larsson et al. | |
| 2009/0067355 A1 | 3/2009 | Haartsen et al. | |
| 2009/0201856 A1* | 8/2009 | Hayashi et al. | 370/328 |
| 2009/0275343 A1* | 11/2009 | Monnes et al. | 455/453 |
| 2010/0085943 A1* | 4/2010 | Reid | H04W 72/085 370/332 |
| 2010/0220594 A1 | 9/2010 | Racz et al. | |
| 2011/0038264 A1 | 2/2011 | Ishii | |
| 2011/0044240 A1* | 2/2011 | Jang | H04L 12/4633 370/328 |
| 2011/0096665 A1* | 4/2011 | McCann et al. | 370/235 |
| 2011/0136478 A1 | 6/2011 | Trigui | |
| 2011/0136484 A1 | 6/2011 | Braun et al. | |
| 2011/0211452 A1* | 9/2011 | Murakami et al. | 370/237 |
| 2011/0267948 A1* | 11/2011 | Koc | H04L 5/003 370/235 |
| 2012/0250551 A1 | 10/2012 | Sartori et al. | |
| 2013/0051226 A1 | 2/2013 | Elefant et al. | |
| 2013/0088990 A1 | 4/2013 | Aaron | |
| 2013/0100844 A1 | 4/2013 | Wiberg et al. | |
| 2013/0142038 A1* | 6/2013 | Pan et al. | 370/230 |
| 2014/0233391 A1* | 8/2014 | Reider et al. | 370/236 |
| 2014/0334424 A1 | 11/2014 | Huang et al. | |
| 2015/0305017 A1 | 10/2015 | Fong et al. | |

FOREIGN PATENT DOCUMENTS

| | | |
|---|---|---|
| KR | 1020080084588 | 9/2008 |
| WO | WO03010979 A2 | 2/2003 |
| WO | WO2013063832 A1 * | 11/2013 |

OTHER PUBLICATIONS

Office Action for U.S. Appl. No. 13/676,044, dated Dec. 22, 2014, Pablo Tapia, "Device-Based Architecture for Self Organizing Networks", 24 pages.

Office action for U.S. Appl. No. 13/676,044, dated Aug. 26, 2015, Tapia, "Device-Based Architecture for Self Organizing Networks", 10 pages.

The Partial Supplementary European Search Report dated Jul. 27, 2015 for European patent application No. 12850667.2, 6 pages.

The Extended EP Search Report dated Nov. 16, 2015 for European Patent Application 12850667.2, 14 pages.

Office action for U.S. Appl. No. 13/676,044, dated May 5, 2016, Tapia, "Device-Based Architecture for Self Organizing Networks", 23 pages.

The Extended European Search Report dated Aug. 3, 2017 for European patent application No. 17176848.4, 10 pages.

* cited by examiner

CONTROLLING UPLINK CONGESTION IN A WIRELESS COMMUNICATION NETWORK

CROSS REFERENCE TO RELATED APPLICATIONS

This disclosure claims priority to U.S. Provisional Patent Application No. 61/559,669, filed Nov. 14, 2011, the entire specification of which is hereby incorporated by reference in its entirety.

BACKGROUND

In recent years, telecommunication devices have advanced from offering simple voice calling services to providing users with many new features. Telecommunication devices now provide messaging services such as email, text messaging, and instant messaging; data services such as Internet browsing; media services such as storing and playing a library of favorite songs; location services; and many others.

Thus, apart from voice traffic (e.g., traffic associated with communicating voice signal during a telephone call), telecommunication devices often communicate data traffic (e.g., traffic associated with, for example, browsing the Internet) with a base station. As an example, while browsing the Internet, a telecommunication device may download data packets from a base station, and upload data packets to the base station.

In a wireless communication network, a base station may communicate with a plurality of proximally located telecommunication devices. In general, in such a wireless communication network, the downlink traffic (e.g., traffic from the base station to a telecommunication device) may be heavier than the uplink traffic (e.g., traffic from the telecommunication device to the base station). For example, while a user uses the telecommunication device to browse the Internet, more number of data packets, in general, gets downloaded by the telecommunication device from the base station, compared to the number of data packets uploaded by the telecommunication device to the base station.

However, uplink traffic generally comprises smaller packets, e.g., compared to the downlink traffic (e.g., due to a nature of Internet browsing). Moreover, an interval during which uplink data packets are transmitted may be smaller, e.g., compared to an interval during which downlink data packets are transmitted. Thus, signaling overhead for the uplink traffic (e.g., comprising control signals, acknowledgements, etc. associated with uplink traffic) may be significant (e.g., compared to the downlink traffic). These factors may lead to congestion in the uplink traffic. Congestion in the uplink traffic may have an adverse effect on a wireless communication network, e.g., may result in call failure, relatively high noise in the uplink traffic, or the like.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein is a wireless communication network that includes architecture for detecting congestion in uplink traffic from various user equipments (UEs) to a base station (BS), and controlling the congestion. For example, the BS (or any other appropriate component of the network) may detect congestion in the uplink traffic from the plurality of UEs, and also detect a level of the congestion (e.g., the level of the congestion may provide a measure of the congestion). Based on the detected congestion, various measures may be taken to control the congestion (e.g., to reduce or mitigate the congestion).

In an embodiment, based on detecting the congestion, the BS (or any other appropriate component of the network) may modify one or more network settings associated with one or more UEs included in the network. The UEs may receive the modified network settings, and communicate with the BS based on the modified network settings.

In an embodiment, based on detecting the congestion, the BS (or any other appropriate component of the network) may modify network settings associated with a bit rate, a transmit time interval (tti) and/or a transmission power used by the UEs to transmit to the BS. For example, the BS (or any other appropriate component of the network) may facilitate the UEs to transmit to the BS using a reduced bit rate, a reduced tti and/or a reduced transmission power, resulting in a corresponding reduction in the congestion in the uplink traffic. In an embodiment, the BS (or any other appropriate component of the network) may facilitate the UEs to transmit to the BS using reduced signaling overhead (e.g., where the signaling overhead comprises control signals, acknowledgements, etc. associated with the transmission of uplink traffic), resulting in a corresponding reduction in the congestion in the uplink traffic. Such a reduction in the signaling overhead may be achieved, for example, by enabling a higher connection time between the UEs and the BS for uplink transmission, having the UEs enter a sleep mode less frequently, changing a communication protocol used for communication between the UEs and the BS, and/or the like.

The specific measure(s) taken to reduce the congestion may be based on the detected level of the congestion. For example, for a low level of the detected congestion (e.g., based on the congestion exceeding a first threshold level), a UE may marginally reduce a bit rate for transmission to the BS. However, for a high level of the detected congestion (e.g., based on the congestion exceeding a second threshold level, where the second threshold level may be higher than the first threshold level), the UE may significantly reduce the bit rate for transmission to the BS, reduce a transmission power for transmission to the BS, and enter the sleep mode less frequently (e.g., to reduce the signaling overhead associated with entering the sleep mode).

Example Operating Environment

Figure 1:
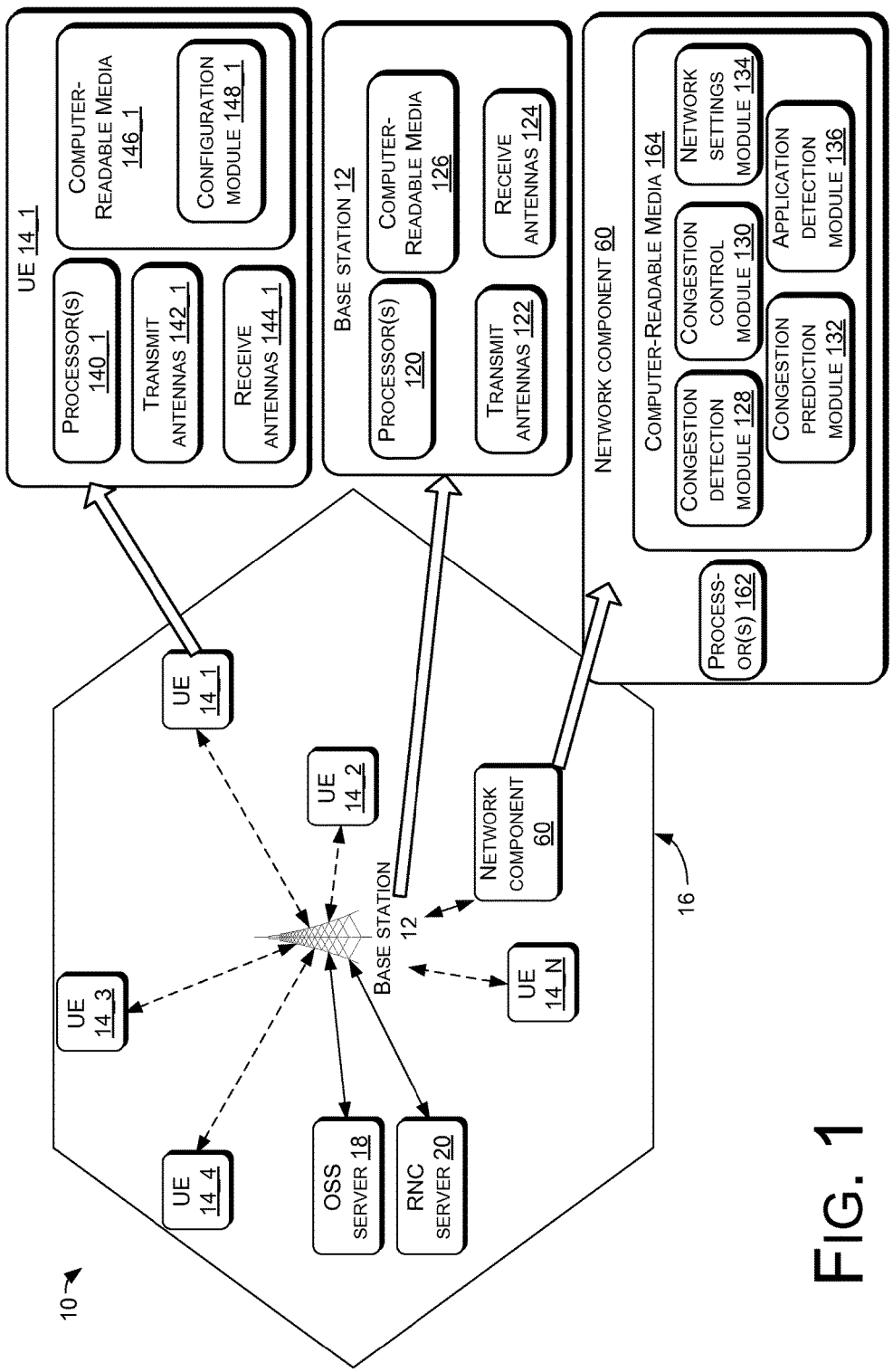
FIG. 1 illustrates a wireless communication network in which congestion in uplink traffic is detected and controlled, in accordance with various embodiments.

FIG. 1 illustrates a wireless communication network 10 (also referred to herein as network 10) in which congestion in uplink traffic is detected and controlled, in accordance with various embodiments. The network 10 comprises a BS 12 communicatively coupled to a plurality of UEs 14_1, 14_2, . . . , 14_N, where N is an appropriate integer. The BS 12 serves UEs located within a geographical area, e.g., within a cell 16. FIG. 1 illustrates the cell 16 to be hexagonal in shape, although other shapes of the cell 16 may also be possible.

In an embodiment, the UEs 14_1, . . . , 14_N may comprise any appropriate devices for communicating over a wireless communication network. Such devices include mobile telephones, cellular telephones, mobile computers, Personal Digital Assistants (PDAs), radio frequency devices, handheld computers, laptop computers, tablet computers, palmtops, pagers, integrated devices combining one or more of the preceding devices, and/or the like. As such, UEs 14_1, . . . , 14_N may range widely in terms of capabilities and features. For example, one of the UEs 14_1, . . . , 14_N may have a numeric keypad, a capability to display only a few lines of text and be configured to interoperate with only Global System for Mobile Communications (GSM) networks. However, another of the UEs 14_1, . . . , 14_N (e.g., a smart phone) may have a touch-sensitive screen, a stylus, an embedded GPS receiver, and a relatively high-resolution display, and be configured to interoperate with multiple types of networks. UEs 14_1, . . . , 14_N may also include SIM-less devices (i.e., mobile devices that do not contain a functional subscriber identity module ("SIM")), roaming mobile devices (i.e., mobile devices operating outside of their home access networks), and/or mobile software applications.

In an embodiment, the BS 12 may be any of a base station, a node B, an evolved node B (enode B), or any other access network component. The term "base station," as used herein, includes any or all of base stations, node Bs, or enode Bs. The BS 12 may communicate voice traffic and/or data traffic with one or more of the UEs 14_1, . . . , 14_N. The BS 12 may communicate with the UEs 14_1, . . . , 14_N using one or more appropriate wireless communication protocols or standards. For example, the BS 12 may communicate with the UEs 14_1, . . . , 14_N using one or more standards, including but not limited to GSM, Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (including IEEE 802.16e-2005 and IEEE 802.16m protocols), High Speed Packet Access (HSPA), (including High Speed Downlink Packet Access (HSDPA) and High Speed Uplink Packet Access (HSUPA)), Ultra Mobile Broadband (UMB), and/or the like.

The BS 12 may be communicatively coupled (e.g., using a backhaul connection, illustrated using solid lines in FIG. 1) to a number of backhaul equipments, e.g., an operation support subsystem (OSS) server 18, a radio network controller (RNC) 20, and/or the like.

In an embodiment, the base station 12 may comprise processors 120, one or more transmit antennas 122, one or more receive antennas 124, and computer-readable media 126. The processors 120 may be configured to execute instructions, which may be stored in the computer-readable media 126 or in other computer-readable media accessible to the processors 120. In some embodiments, the processors 120 is a central processing unit (CPU), a graphics processing unit (GPU), or both CPU and GPU, or any other sort of processing unit.

The one or more transmit antennas 122 may transmit signals to the UEs 14_1, . . . , 14_N, and the one or more receive antennas 124 may receive signals from the UEs 14_1, . . . , 14_N. The antennas 122 and 124 include any appropriate antennas known in the art. For example, antennas 122 and 124 may include radio transmitters and radio receivers that perform the function of transmitting and receiving radio frequency communications. In an embodiment, the antennas 122 and 124 may be included in a trans-receiver module of the BS 12.

The computer-readable media 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the base station 12. The computer-readable media 126 may reside within the base station 12, on one or more storage devices accessible on a local network to the base station 12, on cloud storage accessible via a wide area network to the base station 12, or in any other accessible location.

The computer-readable media 126 may store several modules, such as instructions, data stores, an operating system module, basic input/output systems (BIOS), not illustrated in FIG. 1, to be executed on the processors 120. Furthermore, although not illustrated in FIG. 1, the base station 12 may comprise several other components, e.g., a power bus configured to supply power to various components of the base station 12, one or more interfaces to communicate with various backhaul equipments, and/or the like.

In an embodiment, the BS 12 may be coupled to a network component 60, which may comprise processors 162 and a computer-readable media 164 (which may be, for example, similar to the computer-readable media 126). The computer-readable media 164 may store several modules, such as instructions, data stores, and so forth that are configured to execute on the processors 162. For instance, the computer-readable media 164 may store a congestion detection module 128, a congestion control module 130, a congestion prediction module 130, a network settings module 134, and an application detection module 136, as will be discussed in more detail herein later.

In an embodiment, the network component 60 (or a part of the network component 60) may be included in, or be a part of the BS 12, the OSS server 18, the RNC 20, another appropriate server associated with the network 10, and/or the like. For example, although FIG. 1 illustrates the computer-readable media 164 in the network component 60 storing the congestion detection module 128, the congestion control module 130, the congestion prediction module 130, the network settings module 134, and the application detection module 136, in various other embodiments, one or more of these modules may be stored in any appropriate component of the network 10 (e.g., in the BS 12, the OSS server 18, the RNC 20, another appropriate server associated with the network 10).

In an embodiment, the UE 14_1 may comprise processors 140_1, one or more transmit antennas 142_1, one or more receive antennas 144_1, and computer-readable media 146. The processors 140_1 may be configured to execute instructions, which may be stored in the computer-readable media 146_1 or in other computer-readable media accessible to the processors 140_1. In some embodiments, the processors 140_1 is a central processing unit (CPU), a graphics processing unit (GPU), or both CPU and GPU, or any other sort of processing unit. The one or more transmit antennas 142_1 may transmit signals to the base station 12, and the one or more receive antennas 144_1 may receive signals from the base station 12. In an embodiment, the antennas 142_1 and 144_1 may be included in a trans-receiver module of the UE 14_1.

The computer-readable media 146_1 may also include CRSM. The CRSM may be any available physical media accessible by a computing device to implement the instructions stored thereon. CRSM may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which can be used to store the desired information and which can be accessed by the UE 14_1.

The computer-readable media 146_1 may store several modules, such as instructions, data stores, and so forth that are configured to execute on the processors 140_1. For instance, the computer-readable media 140_1 may store a configuration module 148_1. Although not illustrated in FIG. 1, the computer-readable media 146_1 may also store one or more applications configured to receive and/or provide voice, data and messages (e.g., short message service (SMS) messages, multi-media message service (MMS) messages, instant messaging (IM) messages, enhanced message service (EMS) messages, etc.) to and/or from another device or component (e.g., the base station 12, other UEs, etc.).

Although not illustrated in FIG. 1, the UE 14_1 may also comprise various other components, e.g., a battery, a charging unit, one or more network interfaces, an audio interface, a display, a keypad or keyboard, a GPS receiver and/or other location determination component, and other input and/or output interfaces.

Although FIG. 1 illustrates only one UE (i.e., the UE 14_1) in detail, each of the other UEs 14_2, . . . , 14_N may have a structure that is at least in part similar to that of the UE 14_1. For example, similar to the UE 14_1, each of the UEs 14_2, . . . , 14_N may comprise processors, one or more transmit antennas, one or more receive antennas, and computer-readable media including a configuration module.

In an embodiment, the network settings module 134 maintains a plurality of network settings and/or UE settings (e.g., associated with one or more of the UEs) associated with the network 10. For the remaining portion of the disclosure, a network setting comprises a setting that is associated with the network 10 and/or a setting that is associated with one or more of the UEs. Individual network settings maintained by the network settings module 134 may be pertinent to a single UE of the UEs 14_1, . . . , 14_N, a subset of the UEs 14_1, . . . , 14_N, or each of the UEs 14_1, . . . , 14_N. For example, a network setting of the plurality of network settings may specify a maximum bit rate at which a UE (or each of the UEs 14_1, . . . , 14_N) may transmit data to the BS 12. Another network setting of the plurality of network settings may specify a transmit time interval (tti) used by each of the UEs 14_1, . . . , 14_N to transmit data to the BS 12. Yet another network setting of the plurality of network settings may specify a maximum power that each of the UEs 14_1, . . . , 14_N may use to transmit data to the BS 12 (where the maximum power is also referred to herein as maximum uplink transmission power). The plurality of network settings maintained by the network settings module 134 may also include any other appropriate type of network settings.

In an embodiment, one or more of the plurality of network settings maintained by the network settings module 134 may be communicated to the UEs 14_1, . . . , 14_N (e.g., by the transmit antennas 142_1 to the configuration module of the UEs 14_1, . . . , 14_N). Based on receiving the network settings, the UEs 14_1, . . . , 14_N (e.g., the corresponding configuration modules) may configure themselves and communicate with the BS 12 accordingly.

Detection of Congestion in the Uplink Traffic

In an embodiment, the congestion detection module 128 may detect congestion in the traffic between the base station 12 and the UEs 14_1, . . . , 14_N. In an embodiment, the congestion detection module 128 may also detect a level of congestion in the traffic between the base station 12 and the UEs 14_1, . . . , 14_N. For example, the congestion detection module 128 may detect the congestion (and the level of congestion) in the uplink traffic from the UEs 14_1, . . . , 14_N to the base station 12. In an embodiment, the level of congestion provides a measure or a severity of the congestion. However, in another embodiment, the congestion detection module 128 may detect congestion in the uplink traffic, but refrain from detecting a level of the congestion in the uplink traffic.

The congestion detection module 128 may use one or more appropriate metrics to detect congestion in the uplink traffic from the UEs 14_1, . . . , 14_N to the base station 12. For example, the congestion detection module 128 may detect a number of failed telephone calls (e.g., telephone calls that have failed to initiate, and/or was abandoned while in progress) from and/or to the UEs 14_1, . . . , 14_N due to the congestion in the uplink traffic. For example, the congestion detection module 128 may keep track of such a number of failed telephone calls exceeding one or more thresholds numbers within a specific time interval. In another example, the congestion detection module 128 may detect noise in uplink traffic from the UEs 14_1, . . . , 14_N to the BS 12. In yet another example, the congestion detection module 128 may detect a rate of increase in the noise in uplink traffic from the UEs 14_1, . . . , 14_N to the BS 12 (e.g., detect that the noise in the uplink traffic has increased by 10 dB in the last 15 minutes). In yet another example, the congestion detection module 128 may detect a number of signaling events in the BS, which are associated with the uplink traffic (e.g., detect that the number of signaling events exceeds a threshold number). In yet another example, the congestion detection module 128 may detect an amount of data processing resource used by the BS for processing the uplink traffic (e.g., detects that the BS uses more than a threshold amount of computing resource for processing the uplink traffic). Based on one more such detections, the congestion detection module 128 may detect congestion, and possibly the level of congestion, in the uplink traffic from the UEs 14_1, . . . , 14_N to the base station 12.

For example, during a first time and a second time, the congestion detection module 128 may respectively detect a first level of congestion and a second level of congestion in the uplink traffic, where the first level of congestion may be relatively higher than the second level of congestion. For example, the first level of congestion may be detected based on detecting N1 number of failed telephone calls due to uplink congestion and M1 dB of noise in uplink traffic; and the second level of congestion may be detected based on detecting N2 number of failed telephone calls due to uplink congestion and M2 dB of noise in uplink traffic. The congestion detection module 128 may detect the first level of congestion to be higher than the second level of congestion, based on the values of N1, N2, M1 and M2 (e.g., based on N1 and M1 being higher than N2 and M2, respectively).

Congestion Control in the Uplink Traffic

In an embodiment, based on the congestion detection module 128 detecting congestion (and possibly the level of congestion) in the uplink traffic, the congestion control module 130 may take various measures to control the congestion in the uplink traffic. For example, based on the detected level of congestion exceeding a first threshold, the congestion control module 130 may take a first measure to control the congestion in the uplink traffic; based on the detected level of congestion exceeding a second threshold, the congestion control module 130 may take a second measure to control the congestion in the uplink traffic, and so on. The first threshold and the second threshold may be dynamic thresholds that are adjusted based on, for example, operating conditions of the network 10.

In an embodiment, in order to control the congestion in the uplink traffic, the congestion control module 130 may modify one or more of the network settings maintained by the network settings module 134. Such modification of the network settings may be communicated to the UEs 14_1, ..., 14_N, based on which the UEs 14_1, ..., 14_N may be configured to reduce the congestion in the uplink traffic.

In an example, a bearer may be associated with wireless communication between a UE and the BS 12, as is well known to those skilled in the art. The bearer may specify various parameters associated with the communication between the UE and the BS 12 (e.g., may specify a bit rate, a tti and/or maximum power used for communication between the UE and the BS 12). In an embodiment, based on the congestion detection module 128 detecting congestion (and possibly the level of congestion) in the uplink traffic, the congestion control 130 module may facilitate limiting the bearer associated uplink communication from one or more of the UEs 14_1, ..., 14_N to the BS 12. Limiting the bearer may comprise reducing a bit rate, a tti and/or maximum power used for communication from one or more of the UEs 14_1, ..., 14_N to the BS 12. For example, in order to facilitate limiting the bearer, the congestion control module 130 may modify one or more of the network settings maintained by the network settings module 134 (e.g., network settings associated with the bit rate, tti and/or maximum power used for communication from one or more of the UEs 14_1, ..., 14_N to the BS 12).

For example, based on detecting congestion in the uplink traffic, the congestion control module 130 may modify a network setting maintained by the network settings module 134, such that one or more of the UEs 14_1, ..., 14_N transmit data to the BS 12 at a reduced bit rate. For example, Release 99 (R99) of the Third Generation (3G) Mobile System developed within the Third Generation Partnership Project (3GPP) specifies various possible bit rates (e.g., 32 Kilobits per second (kbps), 64 kbps, 128 kbps, 256 kbps, 384 kbps, or the like) for transmitting data from a UE to a BS. In the network 10, while no congestion (or a relatively low level of congestion) in the uplink traffic is detected, one or more of the UEs 14_1, ..., 14_N may transmit data to the BS at 384 kbps. Once a congestion in the uplink traffic is detected (e.g., by the congestion detection module 128) to exceed a threshold value, the congestion control module 130 may modify the network setting maintained in the network settings module 134 such that the one or more of the UEs 14_1, ..., 14_N now transmit data to the BS at a reduced bit rate (e.g., 256 kbps, 128 kbps, or even lower bit rate). The reduction in the bit rate may be based on the level of the detected congestion (e.g., for a higher the level of the congestion, the bit rate may be reduced further). In an embodiment, the bit rate may be gradually decreased to control the congestion.

A tti may refer to a duration of a transmission (e.g., duration in which one block of data is transmitted) by a UE to the BS 12. In an embodiment, based on detecting congestion in the uplink traffic, the congestion control module 130 may modify another network setting maintained by the network settings module 134, such that the UEs 14_1, ..., 14_N transmits data to the BS 12 at a reduced tti. For example, the HSUPA standard specifies various possible ttis (e.g., 10 millisecond (ms), 2 ms, or the like) for transmitting data from a UE to a BS. In the network 10, while no (or relatively low level) of congestion in the uplink traffic is detected, one or more of the UEs 14_1, ..., 14_N may transmit data to the BS at 10 ms tti. Once a level of the congestion in the uplink traffic is detected by the congestion detection module 128 to exceed a threshold value, the congestion control module 130 may modify the network settings maintained in the network settings module 134 such that the one or more of the UEs 14_1, ..., 14_N now transmit data to the BS at a reduced tti (e.g., 2 ms). In an embodiment, the reduction in the tti may be based on the level of the detected congestion (e.g., for a higher the level of the congestion, the tti may be reduced further). In an embodiment, the tti may be gradually decreased to control the congestion.

In an embodiment, based on detecting congestion in the uplink traffic, the congestion control module 130 may modify another network setting maintained by the network settings module 134, such that the UEs 14_1, ..., 14_N transmits data to the BS 12 at a reduced power. For example, a reduction in the bit rate and/or a reduction in the tti may result in a reduction in the transmission power of the UEs. Additionally, one or more of the UEs 14_1, ..., 14_N may further decrease the power at which data is transmitted to the BS 12. The reduction in the transmission power may be based on the level of the detected congestion (e.g., for a higher the level of the congestion, the transmission power may be reduced further). In an embodiment, the transmission power may be gradually decreased to control the congestion.

In an embodiment, based on detecting congestion in the uplink traffic, the congestion control module 130 may modify yet another network setting maintained by the network settings module 134, such that an UE transmits data to the BS 12 using a different carrier frequency. For example, one or more UEs may use a carrier frequency for communication with the BS 12. Based on detecting congestion in the uplink traffic, an UE of the one or more of the UEs may be shifted to a different carrier frequency to communicate with the BS 12.

In an embodiment, reduction in the bit rate, the tti and/or the transmission power may be based on a communication protocol used by a UE to transmit to the BS 12. For example, a UE of the UEs 14_1, ..., 14_N may use a first communication protocol for transmitting voice traffic from the UE to the BS 12, and may use a second communication protocol for transmitting data traffic from the UE to the BS 12. In an example, as voice traffic is relatively more time sensitive, the congestion control module 130 may facilitate (e.g., by modifying the network settings maintained by the network settings module 134) a reduction in the bit rate, tti and/or transmission power used in accordance with the second communication protocol for transmitting data traffic from the UE to the BS 12 (e.g., while refraining from reducing the bit rate, tti and/or transmission power used in accordance with the first communication protocol for transmitting voice traffic from the UE to the BS 12).

In an embodiment, subsequent to reducing the bi rate, tti and/or the transmission power of a UE of the UEs 14_1, . . . , 14_N, a communication carrier used for communication between the UE and the BS may be reset (or a different communication carrier may be used for communication between the specific UE and the BS). For example, when a large number of UEs (e.g., all or a subset of the UEs communicating with the BS 12) reduce bi rate, tti and/or transmission power for transmission to the BS 12, such reductions may result in a faster control of the uplink congestion (e.g., may result in a faster convergence of the congestion control algorithm) if the UEs reset and/or switch respective communication carrier used for communicating with the BS 12. Resetting a communication carrier used may involve locking the communication carrier for a short duration (e.g., a few milliseconds, or a few seconds), and unlocking the communication carrier used for communication between the UE and the BS.

Uplink traffic may generally comprise smaller packets, e.g., compared to the downlink traffic (e.g., due to a nature of browsing the Internet from a UE). Moreover, a connection time during which uplink data packets are transmitted may be smaller, e.g., compared to that for downlink data packets. Accordingly, a UE may transmit uplink data in slots, with such slots occurring frequently. Thus, signaling overhead for uplink traffic (e.g., comprising control signals, acknowledgements, etc. associated with the transmission of uplink data packets) may be significant, contributing to the congestion in the uplink traffic.

In an embodiment, in order to mitigate or reduce the congestion in the uplink traffic, a signaling overhead associated with the uplink traffic in the network 10 may be reduced. Merely as an example, a UE may want to transmit 10 data packets to the BS 12. The UE may transmit 6 data packets of the 10 data packets to the BS 12 during a first uplink transmission, and transmit the remaining 4 data packets of the 10 data packets to the BS 12 during a second uplink transmission. However, each of the two uplink transmissions may require transmission of respective control signals, acknowledgement signals, etc., thereby increasing the signaling overhead. Accordingly, in order to reduce the signaling overhead associated with the uplink transmission, all the 10 data packets may be transmitted from the UE to the BS 12 during a single uplink transmission, thereby reducing the control signals, acknowledgement signals, etc., associated with the uplink transmission.

Accordingly, in an embodiment, the signaling overhead associated with the uplink traffic in the network 10 is reduced by, for example, establishing a relatively longer connection time between individual UEs of the UEs 14_1, . . . , 14_N and the BS 12 for uplink transmission, transmitting a relatively large number of data packets from the individual UEs to the BS 12 during a single uplink transmission slot, and/or the like.

A UE may operate in one of several possible modes of operation (e.g., a sleep mode, an idle mode, a standby mode, a hibernation mode, an active mode, and/or the like). For example, the UE may enter a sleep mode (also referred to herein as an idle mode or a low power mode) after a certain period of inactivity. In another example, the UE may periodically enter the sleep mode while being inactive. Each time a UE changes its mode of operation, the UE may signal the BS 12 regarding such a change. Accordingly, a change in the mode of operation of the UE may increase a signaling overhead in the uplink traffic.

In an embodiment, once the congestion detection module 128 detects congestion in the uplink traffic, the congestion control module 130 may facilitate a reduction in the signaling overhead associated with the uplink traffic (e.g., through modification of network settings maintained by the network settings module 134) by reducing a frequency of transition or change in the operating modes of the UEs 14_1, . . . , 14_N. For example, in response to the detected congestion, the UEs 14_1, . . . , 14_N may enter the sleep mode less frequently, thereby reducing the signaling overhead in the uplink traffic associated with entering the sleep mode. For example, the congestion control module 130 may increase a timer of the network settings maintained by the network settings module 134, where the timer is used by the configuration modules of the UEs 14_1, . . . , 14_N to enter the sleep mode. The increase in the timer settings may result in the UEs 14_1, . . . , 14_N to enter the sleep mode less frequently (e.g., after longer intervals of inactivity).

In an embodiment, the amount of increase in the timer may be based on the level of the detected congestion in the uplink traffic. For example, in response to the level of the detected congestion in the uplink traffic exceeding a first threshold level, the timer may be increased by a first amount; and in response to the level of the detected congestion in the uplink traffic exceeding a second threshold level, the timer may be increased by a second amount. The second threshold level may be higher than the first threshold level, and accordingly, the second amount may be higher than the first amount.

In an embodiment, a UE may communicate with the BS 12 using one or more of a plurality of communication protocols. For example, a UE may utilize second-generation (2G) and 2G transitional mobile telephony protocols (e.g., GSM, IS-95, GPRS, IS-2000, EDGE, and/or the like) to communicate with the BS 12. The UE may also utilize 3G and 3G transitional mobile telephony protocols (e.g., UMTS, IS-856, HSDPA, HSUPA, EVDO, IEEE 802.16e-2005, and/or) to communicate with the BS 12. The UE may also utilize fourth-generation (4G) and 4G transitional mobile telephony protocols (e.g., LTE, Advanced LTE or LTE+, WiMAX, and/or the like) to communicate with the BS 12. Some of these communication protocols may involve relatively higher signaling overhead compared to the others. For example, a 4G protocol may require relatively higher signaling overhead compared to a 3G protocol, and a 3G protocol may require relatively higher signaling overhead compared to a 2G protocol.

In an embodiment, in response to detecting the congestion in the uplink traffic, one or more of the UEs 14_1, . . . , 14_N may change a communication protocol used for communicating with the BS 12 (e.g., may start using a communication protocol that requires less signaling overhead). For example, if the UE 14_1 is using a 4G communication protocol while the congestion is detected, the UE 14_1 may switch to a communication protocol (e.g., a 3G communication protocol, or a 2G communication protocol) that requires less signaling overhead, based on the detected level of congestion.

In an embodiment, in response to detecting the congestion in the uplink traffic, the BS 12 may also perform load balancing. For example, the BS 12 may handover one or more UEs, which are at or near a boundary of the cell 16, to a neighboring BS. For example, FIG. 1 illustrates the UE 14_3 being located near the boundary of the cell 16. In response to detecting the congestion in the uplink traffic, the BS 12 may handover the UE 14_3 to a neighboring BS. Such a handover may decrease a number of UEs served by the BS 14, thereby reducing the congestion in the uplink traffic of the network 10.

In an embodiment, the application detection module 136 may detect one or more applications running on one or more of the UEs 14_1, . . . , 14_4. In an embodiment, the congestion control module 130 may control congestion based on the applications detected to be running on the one or more of the UEs 14_1, . . . , 14_4. For example, the application detection module 136 may detect a first application running of a first UE and a second application running on a second UE, where the first application is more time sensitive and/or more requires higher level of data communication with the BS 12 compared to the second application. Accordingly, while controlling uplink congestion, the congestion control module 130 may decrease a bit rate of the second UE at a higher rate than that of the first UE (e.g., based on detecting that the first application is more time sensitive and/or more requires higher level of data communication with the BS 12 compared to the second application).

The congestion in the uplink traffic, as detected by the congestion detection module 128, may vary with time. For example, the detected congestion may have peaks (e.g., be high for a relatively short duration). If the congestion control module 130 attempts to control the congestion based on such peaks, such control may result in reduction in the quality of service across the network 10 (e.g., such a peak may result in large reduction in bit rate and/or tti in the UEs 14_1, . . . , 14_N, thereby resulting in a large reduction in the quality of service across the network 10). In an embodiment, the congestion detection module 128 may ignore any such peaks in the detected congestion. For example, the congestion detection module 128 may filter the detected congestion to smooth out such peaks in the detected congestion. In another example, the congestion detection module 128 may use a moving average (e.g., use an average of the congestion detected in the last 15 minutes) to detect congestion in the uplink traffic.

Once congestion in the uplink traffic is detected and measures are taken to control the congestion, the congestion may be gradually reduced. For example, based on detecting the level of congestion, the bit rate and/or the tti of various UEs in the network 10 may be reduced, resulting in a gradual reduction in the congestion. Once the congestion is reduced, the original network settings (e.g., the network settings of the UEs prior to detecting the congestion) may be gradually restored. For example, after waiting for a period of time (e.g., 30 minutes) since the level of detected congestion reduces beyond a threshold level, the bit rate, the tti and/or the other network settings of various UEs in the network 10 may be gradually modified to the pre-congestion level.

The congestion detection module 128 detects congestion during or after the occurrence of the congestion. In an embodiment, the congestion prediction module 132 may predict congestion, based on which the congestion control module 130 may proactively take various measures to control (e.g., to avoid or reduce) the predicted congestion. For example, during morning rush hours in the weekdays, a suburban train station may be crowded than usual. Accordingly, it may be predicted (e.g., by the congestion prediction module 132) that during the morning rush hours, a relatively large number of telephone calls may be originating from the train station, leading to a possible congestion in the uplink traffic. Accordingly, even before the congestion is detected by the congestion detection module 128, the congestion control module 130 may proactively take various measures (e.g., as previously discussed) to control the congestion during the morning rush hours at a BS located on or near the train station. In another example, the congestion prediction module 132 may predict congestion in a stadium during a weekend (e.g., while a football match is scheduled in the stadium). In an embodiment, the congestion prediction module 132 may take into account a time of a day (e.g., morning or evening rush hours), a day of a week (e.g., weekdays), a location of the BS 12 (e.g., a train station, a stadium, etc.), and/or the like to predict congestion in the uplink traffic.

Example Operations

Figure 2:
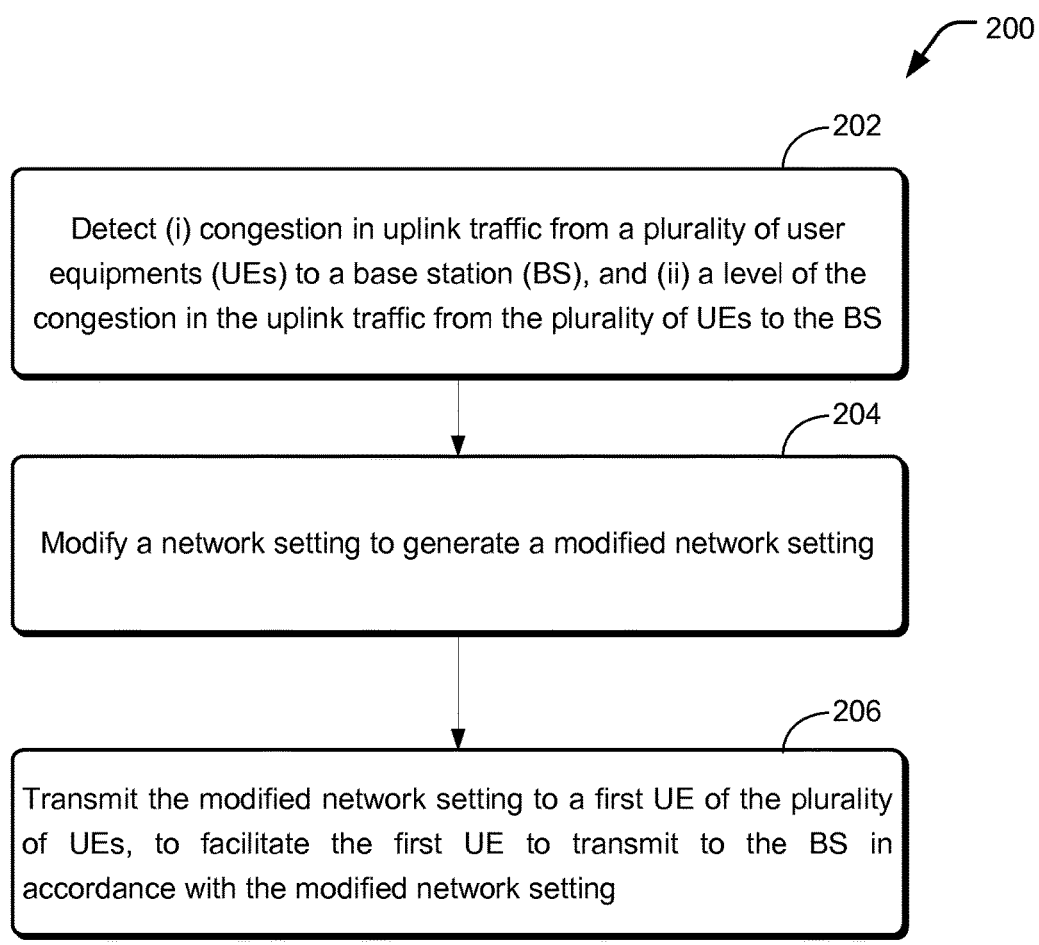
FIG. 2 is a flowchart showing a method of detecting and mitigating congestion in uplink traffic of a wireless communication network, in accordance with various embodiments.

FIG. 2 is a flowchart showing a method of detecting and mitigating congestion in the uplink traffic of a wireless communication network, in accordance with various embodiments. As illustrated at block 202, a congestion detection module detects (i) congestion in uplink traffic from a plurality of UEs (e.g., UEs 14_1, . . . , 14_N) to a BS (e.g., BS 12), and (ii) a level of the congestion in the uplink traffic from the plurality of UEs to the base station. In an embodiment, the detection is based on detecting one or more of (i) a number of failed telephone calls from and/or to the plurality of UEs, (ii) a noise level in the uplink traffic, and (iii) a rise in the noise level in the uplink traffic.

At block 204, based on the detection at block 202, a congestion control module modifies a network setting to generate a modified network setting. The network setting is stored, for example, in a network setting module. In an embodiment, the network setting comprises a bit rate at which a first UE of the plurality of UEs transmits to the BS, and the network setting is modified to decrease the bit rate at which the first UE transmits to the BS. In an embodiment, the network setting comprises a transmission time interval with which the first UE transmits to the BS, and the network setting is modified to decrease the transmission time interval with which the first UE transmits to the BS. In an embodiment, the network setting comprises a maximum power with which the first UE transmits to the BS, and the network setting is modified to decrease the maximum power with which the first UE transmits to the BS. In an embodiment, the network setting comprises a timer based on which the first UE enters a sleep mode, and the network setting is modified to increase a value of the timer. In an embodiment, the network setting comprises a communication protocol used by the first UE to communicate with the BS, and the network setting is modified to change the communication protocol used by the first UE to communicate with the BS. In an embodiment, the BS is a first BS, and the network setting is modified to handover the first UE to a second BS that is neighboring the first BS.

At block 206, a transmission module (e.g., comprising the one or more transmit antennas 122) transmits the modified network setting to the first UE of the plurality of UEs, to facilitate the first UE to transmit to the BS in accordance with the modified network setting.

Figure 3:
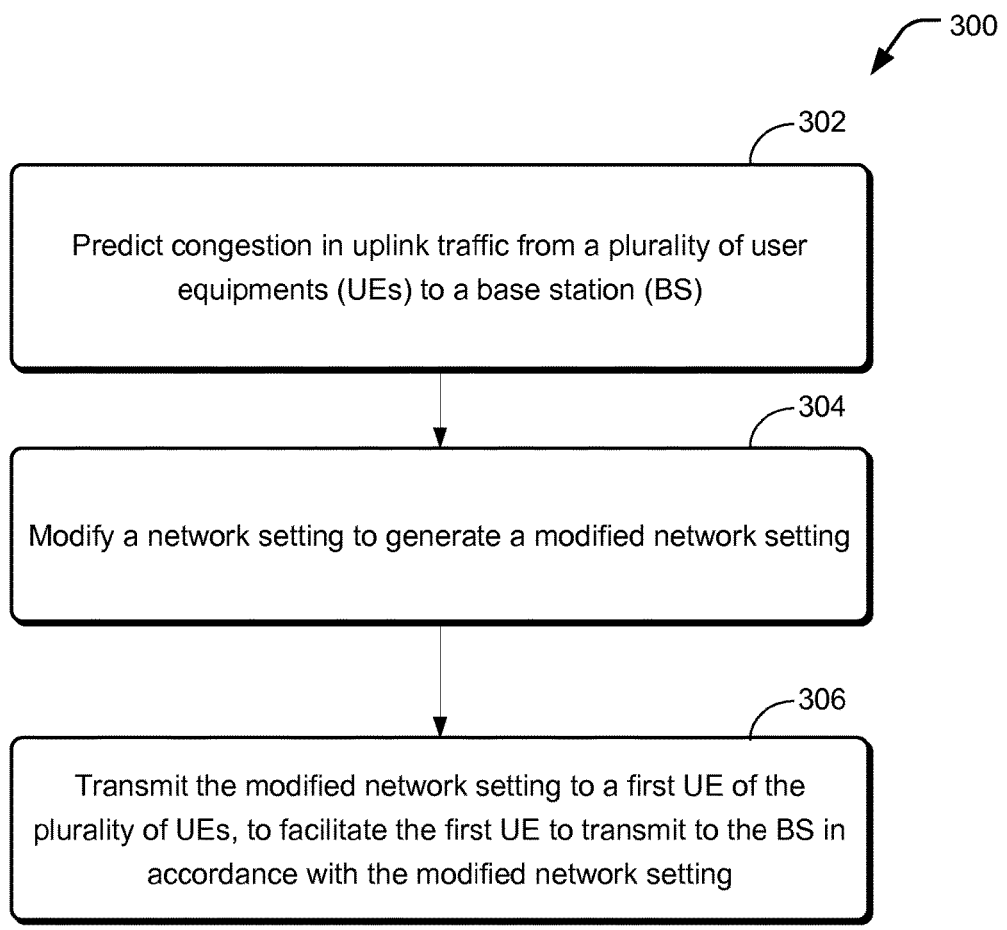
FIG. 3 is a flowchart showing a method of predicting and mitigating congestion in uplink traffic of a wireless communication network, in accordance with various embodiments.

FIG. 3 is a flowchart showing a method of predicting and mitigating congestion in uplink traffic of a wireless communication network, in accordance with various embodiments. As illustrated at block 302, a congestion prediction module predicts congestion in uplink traffic from a plurality of user equipments (UEs) to a base station (BS). At block 304, based on the prediction at block 302, a congestion control module modifies a network setting to generate a modified network setting. At block 306, a transmission module (e.g., comprising the one or more transmit antennas 122) transmits the modified network setting to the first UE of the plurality of UEs, to facilitate the first UE to transmit to the BS in accordance with the modified network setting.

FIGS. 1-3 is directed towards a network component (e.g., the network component 60) detecting (or predicting) congestion in the uplink traffic, and taking one or more measures to mitigate the congestion. However, in an embodiment (and although not illustrated in FIGS. 1-3), the network component 60 (e.g., the congestion detection module 128 and/or the congestion prediction module 132) detects or predicts congestion in the uplink traffic, and transmits the congestion information (e.g., using a congestion information transmission module, not illustrated in FIG. 1) to the UEs (e.g., UEs 14_1, . . . , 14_4). For example, the network component 60 transmits congestion information (e.g., a level or severity of the congestion, and/or other appropriate metrics associated with the congestion in the uplink traffic) to the UEs. Based on receiving the congestion information (e.g., as received by a congestion information reception module in one or more of the UEs, not illustrated in FIG. 1), one or more of the UEs take of or more measures (e.g., by a congestion control module in one or more of the UEs, not illustrated in FIG. 1) to counter or mitigate the uplink congestion (e.g., one or more measures as previously discussed herein). For example, based on receiving the congestion information, a first UE may transmit to the BS 12 using a reduced power level, a second UE may transmit to the BS 12 using a reduced bit rate, and/or the like, as previously discussed herein.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A system comprising:
a processor;
a congestion detection module configured to be operated by the processor to detect (i) congestion in uplink traffic from a plurality of user equipments (UEs) to a base station (BS), and (ii) a level of the congestion in the uplink traffic from the plurality of UEs to the BS;
a congestion control module configured to be operated by the processor to modify, based at least in part on the detected level of congestion exceeding a first threshold, a network or UE setting to generate a modified setting, wherein the network or UE setting is a first wireless communication standard used by a first UE of the plurality of UEs to communicate with the BS, wherein the first wireless communication standard has a first signaling overhead, wherein modifying the network or UE setting comprises:
based at least in part on the detected level of congestion exceeding the first threshold, selecting a second wireless communication standard having a second signaling overhead such that the second signaling overhead is less than the first signaling overhead, and
modifying the network or UE setting to change the wireless communication standard used by the first UE to communicate with the BS to the selected second wireless communication standard to achieve reduced signaling overhead associated with the uplink traffic; and
a transmission module configured to be operated by the processor to transmit the modified setting to the first UE, to facilitate the first UE to transmit to the BS in accordance with the modified setting to achieve reduced signaling overhead associated with the uplink traffic.

2. The system of claim 1, wherein the network or UE setting is a first network or UE setting and the modified setting is a first modified setting, and:
the congestion control module is configured to be operated by the processor to modify, based at least in part on the detected level of congestion exceeding a second threshold, a second network or UE setting to generate a second modified setting; and
the transmission module is configured to be operated by the processor to transmit the second modified setting to the first UE, to facilitate the first UE to transmit to the BS in accordance with the second modified setting.

3. The system of claim 2, wherein the second network or UE setting comprises a bit rate at which the first UE transmits to the BS, and wherein modifying the second network or UE setting comprises:
modifying the second network or UE setting to decrease the bit rate at which the first UE transmits to the BS.

4. The system of claim 2, wherein the second network or UE setting comprises a transmission time interval with which the first UE transmits to the BS, and wherein modifying the second network or UE setting comprises:
modifying the second network or UE setting to decrease the transmission time interval with which the first UE transmits to the BS.

5. The system of claim 2, wherein the second network or UE setting comprises a maximum power with which the first UE transmits to the BS, and wherein modifying the second network or UE setting comprises:
modifying the second network or UE setting to decrease the maximum power with which the first UE transmits to the BS.

6. The system of claim 2, wherein the second network or UE setting comprises a timer based at least in part on which the first UE enters a sleep mode, and wherein modifying the second network or UE setting comprises:
modifying the second network or UE setting to increase a value of the timer.

7. The system of claim 2, wherein the BS is a first BS, and wherein modifying the second network or UE setting comprises:
modifying the second network or UE setting to handover the first UE to a second BS that is neighboring the first BS.

8. The system of claim 2, wherein the second network or UE setting comprises a frequency of a carrier used for communicating between the BS and the first UE, and wherein modifying the second network or UE setting comprises:
modifying the second network or UE setting to decrease the frequency of the carrier used for communicating between the BS and the first UE.

9. The system of claim 1, further comprising:
an application detection module configured to be operated by the processor to detect an application run by the first UE,
wherein modifying the network or UE setting further comprises modifying the network or UE setting associated with the first UE, based on detecting the application run by the first UE.

10. The system of claim 1, wherein:
said detecting further comprises detecting the congestion and the level of the congestion for at least a threshold period of time; and
said modifying the network or UE setting further comprises modifying the network or UE setting, based at least in part on an average level of congestion during the threshold period of time exceeding the first threshold.

11. The system of claim 1, further comprising:
a module configured to be operated by the processor to reset, subsequent to the first UE transmitting to the BS in accordance with the modified setting, a communication carrier used by the first UE to communicate with the BS.

12. The system of claim 1, further comprising:
a module configured to be operated by the processor to dynamically adjust the first threshold.

13. The system of claim 1, further comprising:
a congestion prediction module configured to be operated by the processor to predict congestion in the uplink traffic from the plurality of UEs to the BS; wherein:
the congestion control module configured to be operated by the processor to modify, based at least in part on predicting the congestion, another network or UE setting to generate another modified setting; and
the transmission module configured to be operated by the processor to transmit the another modified setting to the first UE of the plurality of UEs, to facilitate the first UE to transmit to the BS in accordance with the another modified setting.

14. The system of claim 1, wherein modifying the network or UE setting to generate the modified setting further comprises modifying the network or UE setting from a first value to a second value, and wherein:
the congestion detection module is configured to be operated by the processor to detect, subsequent to transmitting the modified setting to the first UE, a reduction in the congestion in the uplink traffic from the plurality of UEs to the BS; and
the congestion control module configured to be operated by the processor to modify, based at least in part on detecting the reduction in the congestion in the uplink traffic, the network or UE setting to the first value.

15. The system of claim 1, wherein detecting the congestion in uplink traffic and the level of the congestion in the uplink traffic is based at least in part on detecting one or more of (i) a number of failed telephone calls from and/or to the plurality of UEs, (ii) a noise level in the uplink traffic, (iii) a rise in the noise level in the uplink traffic, (iv) a number of signaling events in the BS, and (v) an amount of data processing resource used by the BS for processing the uplink traffic.

16. The system of claim 1, wherein:
a transmission module configured to be operated by the processor to transmit, to the plurality of the UEs, the detected level of the congestion in the uplink traffic, to enable one or more of the plurality of UEs to modify a respective UE setting.

17. The system of claim 16, wherein transmitting the detected level of the congestion in the uplink traffic further comprises:
transmitting, to the plurality of the UEs, the detected level of the congestion in the uplink traffic, to enable one or more of the plurality of UEs to modify the respective UE setting to mitigate or reduce the congestion in the uplink traffic.

18. An apparatus comprising:
a processor;
a network settings module configured to be operated by the processor to store a plurality of network or user equipment (UE) settings associated with a plurality of UEs;
a congestion detection module configured to be operated by the processor to detect (i) congestion in uplink traffic between the plurality of UEs and a base station (BS), and (ii) a level of the congestion in the uplink traffic between the plurality of UEs and the BS;
a congestion control module configured to be operated by the processor to modify, based at least in part on the detected level of congestion exceeding a first threshold, a network or UE setting of the plurality of network or UE settings to generate a modified setting, wherein the network or UE setting of the plurality of network or UE settings is a first wireless communication standard used by a first UE of the plurality of UEs to communicate with the BS, wherein the first wireless communication standard has a first signaling overhead, wherein modifying the network or UE setting comprises:
based at least in part on the detected level of congestion exceeding the first threshold, selecting a second wireless communication standard having a second signaling overhead such that the second signaling overhead is less than the first signaling overhead, and
modifying the network or UE setting to change the wireless communication standard used by the first UE to communicate with the BS to the selected second wireless communication standard to achieve reduced signaling overhead associated with the uplink traffic; and
a transmission module configured to be operated by the processor to transmit the modified setting to the first UE of the plurality of UEs, to facilitate the first UE to transmit to the BS in accordance with the modified setting to achieve reduced signaling overhead associated with the uplink traffic.

19. The apparatus of claim 18, wherein:
the network or UE setting is a first network or UE setting and the modified setting is a first modified setting;
the congestion control module is further configured to, based at least in part on the detected level of congestion exceeding a second threshold, modify a second network or UE setting to generate a modified second setting; and
the transmission module is further configured to transmit the modified second setting to the first UE, to facilitate the first UE to transmit to the BS in accordance with the modified second setting.

20. The apparatus of claim 19, wherein the second network or UE setting comprises a bit rate at which the first UE transmits to the BS, and wherein the congestion control module is configured to modify the second network or UE setting by decreasing the bit rate at which the first UE transmits to the BS.

21. The apparatus of claim 18, further comprising:
a congestion prediction module configured to predict congestion in the uplink traffic between the plurality of UEs and the BS,
wherein the congestion control module is further configured to, based at least in part on the predicted congestion, modify another network or UE setting of the plurality of network or UE settings to generate another modified setting, and wherein the transmission module is further configured to transmit the another modified setting to the first UE of the plurality of UEs, to facilitate the first UE to transmit to the BS in accordance with the another modified setting.

22. A system comprising:

a processor;

a congestion prediction module configured to be operated by the processor to predict congestion in uplink traffic from a plurality of user equipments (UEs) to a base station (BS), wherein while the congestion is predicted, a first wireless communication standard is used by a first UE of the plurality of UEs to communicate with the BS, wherein the first wireless communication standard has a first signaling overhead;

a congestion control module configured to be operated by the processor to modify, based at least in part on predicting the congestion, a network or UE setting to generate a modified setting, wherein the network or UE setting is a wireless communication standard used by the first UE to communicate with the BS, wherein modifying the network or UE setting comprises:

based at least in part on a predicted level of congestion exceeding the first threshold, selecting a second wireless communication standard having a second signaling overhead such that the second signaling overhead is less than the first signaling overhead, and modifying the network or UE setting to change the wireless communication standard used by the first UE to communicate with the BS to the selected second wireless communication standard to achieve reduced signaling overhead associated with the uplink traffic; and a transmission module configured to be operated by the processor to transmit the modified setting to the first UE, to facilitate the first UE to transmit to the BS in accordance with the modified setting to achieve reduced signaling overhead associated with the uplink traffic.

23. The system of claim 22, wherein predicting the congestion in the uplink traffic further comprises:

predicting the congestion in the uplink traffic, based at least in part on one or more of a current date, a current time, and a location of the BS.

24. The system of claim 22, further comprising:

a module configured to be operated by the processor to reset, subsequent to the first UE transmitting to the BS in accordance with the modified setting, a communication carrier used by the first UE to communicate with the BS.

* * * * *